June 19, 1951  T. M. LEWIS ET AL  2,557,879
COMBINED PUMP AND ELECTRIC MOTOR UNIT
Filed July 25, 1945
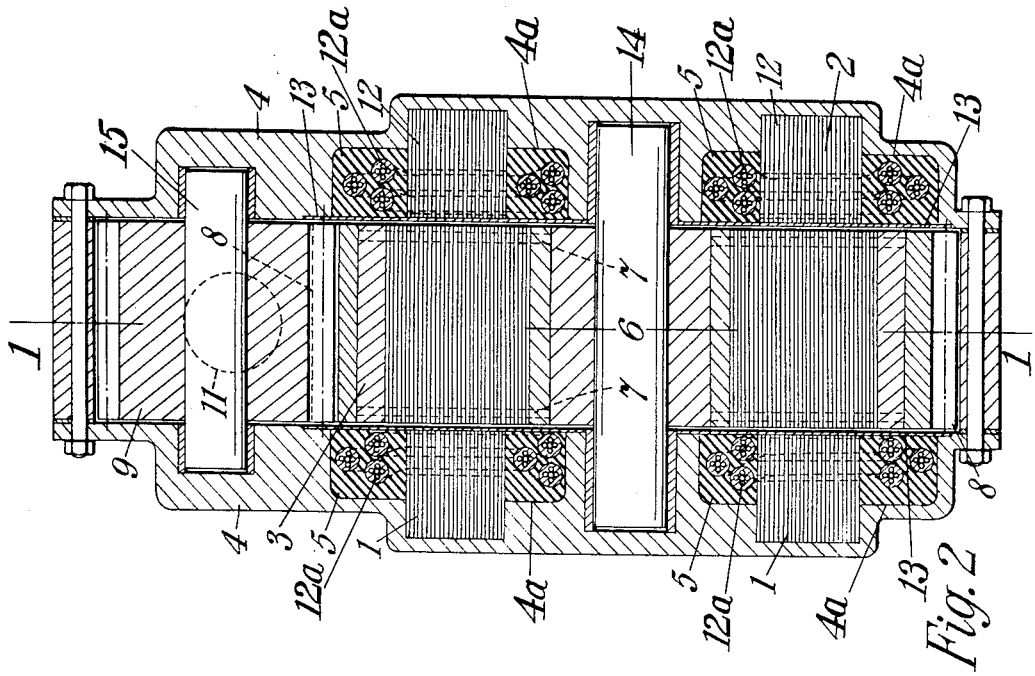
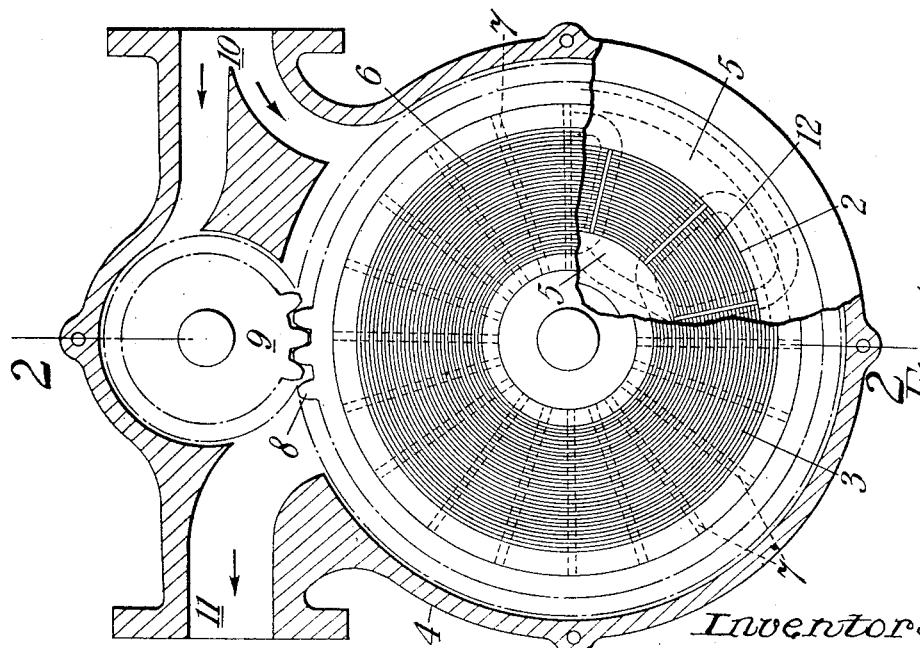
Inventors
T. M. Lewis
E. G. Rounce
A. E. Hills
By Hascock Downing Seebold Attys Patented June 19, 1951

2,557,879

UNITED STATES PATENT OFFICE 2,557,879

COMBINED PUMP AND ELECTRIC MOTOR UNIT

Thomas Maldwyn Lewis, Coates, Bernoldswick, and Ernest Gerald Rounce and Arthur Eric Hills, Colne, England Application July 25, 1945, Serial No. 606,945
In Great Britain July 7, 1944

3 Claims. (Cl. 103—118)

This invention has for its object to provide an improved construction and arrangement of self-driven pump of the gear type which can be inserted in a pipe line without altering the line of flow of the fluid being pumped and which does not necessitate the use of packing glands.

The invention comprises an induction type electric motor in which the rotor is provided with gear teeth which mesh with an idler gear wheel so that the rotor and the idler gear wheel constitute a gear type pump, the fluid inlet and outlet branches being formed in the motor casing which also surrounds the idler gear wheel, and leading to the opposite sides of the point of engagement of the gear teeth.

Referring to the accompanying explanatory drawings:

Figure 1 is a section (with part of the rotor broken away) of an induction type electric motor-gear pump unit constructed in one convenient form in accordance with this invention, the section being taken on the line 1—1 of Figure 2.

Figure 2 is a cross sectional view of the pump shown in Figure 1, the section being taken on the line 2—2 of Figure 1.

The unit illustrated comprises two opposed laminated stators 1 and 2 with a single rotor 3 revolving between the stators on a shaft 14 journalled in the casing 4. The laminations of the stators are set in annular recesses 4a in the casing 4, with the poles 12 cut in the laminations radially with respect to the rotor axis, the windings 12a of the stator being set in a suitable insulating composition 5. The face of the stator and the windings may be protected from the fluid on each side of the rotor by a cover 13 in the form of a thin alloy plate or a thin skin of a suitable plastic or synthetic resin.

The rotor 3 has laminations 6 set in the rotor to face the laminations of the stator. The shorting bars 7 are set through the rotor laminations, radiating from the rotor axis.

The gear teeth 8 may be cut as shown upon a sleeve secured upon the rotor. Such teeth mesh with the corresponding gear teeth on the idler wheel 9 carried on a shaft 15 journalled in the casing 4.

The fluid enters the casing by the inlet branch 10 and divides into parts, one of which leads to the periphery of the rotor whilst the other leads to the periphery of the idler wheel 9. The two streams of fluid travelling one around the rotor and the other around the idler wheel unite Our improvement provides a very compact and efficient form of electro-induction pump.

What we claim is:

1. An electro-induction pump comprising, in combination, a casing, a shaft journalled in the casing, a rotor carried by the shaft, gear teeth upon the rotor periphery, annular recesses in the casing, two laminated stators with their laminations set in said annular recesses in the casing one at each side of the rotor, poles for the stators cut in the laminations radially with respect to the rotor axis, windings for the stators, insulating composition in said annular recesses with the windings embedded in the composition, laminations set in the rotor to face on each side the respective laminations of the stators, shorting bars set through the rotor laminations and radiating from the axis of rotation of the rotor, an idler gear wheel meshing with said gear teeth and surrounded by the casing, a shaft journalled in the casing carrying said idler gear wheel, and fluid inlet and outlet branches in the casing leading to and from respectively the peripheral surfaces of the rotor and idler gear wheels at the opposite sides of the position where they intermesh.

2. In an electro-induction pump as claimed in claim 1, means dividing the fluid inlet into two parts, one of which leads to the periphery of the rotor whilst the other leads to the periphery of the idler gear wheel.

3. In an electro-induction pump as claimed in claim 1, a cover over the face of each stator to shield the stator and its windings from the fluid being pumped.

THOMAS MALDWYN LEWIS.
ERNEST GERALD ROUNCE.
ARTHUR ERIC HILLS.

REFERENCES CITED

The following references are of record in the file of this patent:

UNITED STATES PATENTS

| Number | Name | Date |
|---|---|---|
| 1,659,771 | Fox | Feb. 21, 1928 |
| 1,780,337 | Canton | Nov. 4, 1930 |
| 1,780,338 | Canton | Nov. 4, 1930 |
| 2,118,589 | Carpenter | May 24, 1938 |

FOREIGN PATENTS

| Number | Country | Date |
|---|---|---|
| 580,614 | Great Britain | Sept. 13, 1946 |